United States Patent [19]

Ellis

[11] Patent Number: 4,645,927

[45] Date of Patent: Feb. 24, 1987

[54] CLAY TYPE AND VOLUME EVALUATION

[75] Inventor: Darwin V. Ellis, Ridgefield, Conn.

[73] Assignee: Schlumberger Technology Corporation, New York, N.Y.

[21] Appl. No.: 797,139

[22] Filed: Nov. 12, 1985

[51] Int. Cl.[4] ............................................. G01V 5/14
[52] U.S. Cl. .................................. 250/269; 250/264; 250/266; 250/270
[58] Field of Search ............... 250/266, 264, 262, 265, 250/269, 270

[56] References Cited

U.S. PATENT DOCUMENTS

| Re. 30,827 | 12/1981 | Pelet et al. | 250/256 |
|---|---|---|---|
| 3,453,433 | 7/1969 | Alger et al. | 250/269 |
| 3,521,064 | 7/1970 | Moran et al. | |
| 3,566,117 | 2/1971 | Tixier | 250/264 |
| 4,436,997 | 3/1984 | Allen | 250/256 |
| 4,577,102 | 3/1986 | Sherman et al. | 250/269 |

OTHER PUBLICATIONS

"Element Partition Ratios in Some Sedimentary Environments", Yves Tardy, Sci. Geol., Bull. 28, 1, 59–95, Strasbourg, 1975.

"A Dual Porosity CNL Logging System", Davis et al., SPE 10296.

"Dual Porosity CNL Count Rate Processing", Scott et al., SPE 11146.

*Primary Examiner*—Carolyn E. Fields
*Attorney, Agent, or Firm*—Brumbaugh, Graves, Donohue & Raymond

[57] ABSTRACT

Methods for the determination of clay types and/or clay volumes of an earth formation are disclosed. Information as to the hydroxyl type of the clay minerals is obtained from the difference between an epithermal (or thermal) neutron porosity measurement and a density porosity measurement, and information as to the relative volume fractions of the clays is obtained by cross plotting this porosity difference against the thermal neutron macroscopic capture cross section of the formation. Additional indicators of clay type, e.g., the potassium, iron and boron content of the minerals, may be used to further distinguish between clays, particularly where the intrinsic capture cross sections of different clays are similar.

22 Claims, 7 Drawing Figures

CLAY TYPE AND VOLUME EVALUATION

DESCRIPTION

1. Field of the Invention

The present invention relates to the evaluation of clay-containing earth formations and, more particularly, to improved methods for evaluating the clay type and/or clay content of an earth formation based on measurements made with a neutron porosity tool.

2. Background of the Invention

A difficulty in the evaluation of shaly formations from logging measurements made with a neutronneutron tool has been the need to correct or interpret the logging measurements to take into account the presence of clay minerals. Clays present a difficulty because of the variability with respect to concentrations of hydrogen and of elements with large thermal neutron absorption cross sections. For instance, illite has about half the hydrogen concentration of Kaolinite but may have an order of magnitude higher boron concentration than kaolinite or montmorillionite. A good correction to apparent porosity, therefore, requires a good knowledge of clay type and composition.

One consequence of the thermal neutron absorber problem in clay identification is the possibility of masked gas indication in a shaly sand. Another practical consequence is that the presence of a high iron-illite clay would dictate avoidance of acidization as a producing technique because an iron-oxide gel would be produced which could seal the formation.

In the case of neutron porosity logging measurements, the relationship between the clay minerals and the expected neutron porosity response has not been well understood. The response of a neutron porosity tool (thermal or epithermal) to clay minerals is determined primarily by the hydrogen content of the clay minerals (in the form of hydroxyls), the actual matrix composition being of little significance. In that regard, two large groups of clay types may be identified if intercalated water is ignored, i.e., those with low hydroxyl content —$(OH)_4$— and those with high hydroxyl content —$(OH)_8$—. The observed neutron porosity estimate is primarily dictated by the slowing down length of a formation, which parameter in turn is largely governed by the amount of hydrogen present. Thus for a given volume of clay in a porous medium, the effective slowing down length—and hence the neutron porosity response—can be significantly different for high and low hydroxyl clays. In addition, a thermal neutron porosity measurement will be further influenced by the presence of thermal neutron absorbers associated with the clay, these being principally iron, potassium and boron. For example, neither the thermal porosity measurement nor the epithermal porosity measurement will be representative of the actual porosity in a shaly sand. Both will respond to the hydrogen associated with the clay mineral(s). Hence the accurate determination of the clay volume is dependent upon knowledge of the hydroxyl type.

SUMMARY OF THE INVENTION

It is an object of the invention, therefore, to provide improved methods for determining clay type and/or clay content of earth formations by ascertaining information of the hydroxyl type of clay minerals contained in an earth formation.

Another object of the invention is to provide such information of clay type and/or clay content by deriving a neutron porosity-based measurement that is influenced both by porosity and clay minerals and combining such measurement with a further measurement that is functionally related to clay type.

In accordance with the invention, these and other objects of the invention are attained by deriving a first measurement of the formation porosity by use of an epithermal neutron-type technique ($\phi_{epi}$), deriving a second measurement of the formation porosity using a density-type technique ($\phi_d$), combining the two porosity measurements to obtain a measurement of the difference therebetween ($\phi_{epi} - \phi_d$), which difference measurement is functionally related to the volume and hydroxyl type of the clay minerals, deriving a measurement of another characteristic of the formation that is functionally related to clay type, and combining the porosity difference measurement and the formation characteristic measurement to obtain an indication of at least one of the clay type and the relative volume of clay minerals in the formation.

Preferably, the additional formation characteristic measured is the thermal neutron macroscopic absorption cross section, $\Sigma$. As noted, the separation between $\phi_{epi}$ and $\phi_d$ is related to the volume of clay present and the type of clay present. By cross plotting ($\phi_{epi} - \phi_d$) against $\Sigma$, it is possible, in accordance with the present invention, to identify the hydroxyl type present, i.e., $(OH)_4$ or $(OH)_8$, as well as to obtain an indication of the relative volume of clay present. In this manner, information as to the presence and relative volumes of the four principal clay types, chlorite, kaolinite, illite and montmorillionite, can be obtained.

Where desired, still further information for differentiating between clay types can be obtained by measuring the concentrations of one or more of the principal thermal neutron absorbers, such as iron, potassium or boron, associated with clays. In cases of clays of different hydroxyl types but similar intrinsic values of $\Sigma$, the foregoing cross plot technique may still be used by replacing the $\Sigma$ measurement with the iron or potassium content measurement.

BRIEF DESCRIPTION OF THE DRAWINGS

Further objects and advantages of the invention will be apparent from the following description of illustrative embodiments thereof, in conjunction with the accompanying drawings in which.

DETAILED DESCRIPTION

From the foregoing, it may be seen that an epithermal porosity measurement, $\phi_{epi}$, of a sand formation containing a clay mineral will give a value that exceeds the density porosity measurement (assuming a grain density of 2.65 g/cc) by an amount related to the clay volume fraction and the concentration of hydrogen (hydroxyl type) of the particular clay mineral. For a thermal porosity measurement, $\phi_{th}$, the same line of reasoning holds, but in addition the porosity value will be somewhat higher due to additional thermal neutron absorption from associated iron or potassium atoms or the presence of boron or gadolinium. Even in the best case, in an iron or potassium-free clay mineral with no additional neutron absorbers, the thermal and epithermal porosity values will be equal, but both will still be larger than a simple estimate made from the density measurement assuming a grain density of about 2.65 g/cc.

Figure 1:
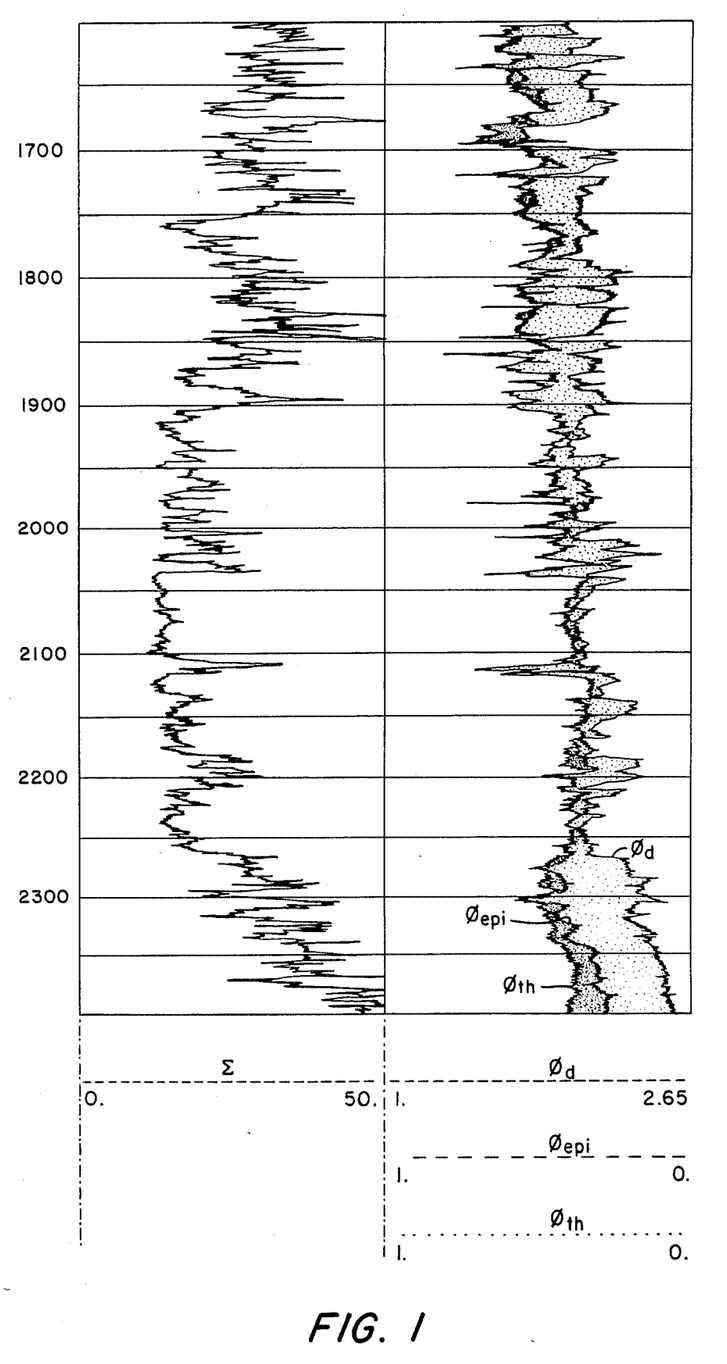
FIG. 1 is a log showing a density porosity estimate, $\phi_d$, an epithermal neutron porosity estimate, $\phi_{epi}$, a thermal neutron porosity measurement, $\phi_{th}$ and $\Sigma$.

This is illustrated in FIG. 1, which shows the separation between density and neutron porosity estimates due to the presence of clay. In the track shown, three porosity measurements on a scale of 0 to 100 porosity units, PU, are exhibited, namely $\phi_d$, $\phi_{epi}$ and $\phi_{th}$. In the middle zone, from 2040 feet to 2110 feet, which is a clean (no clay) zone, all three estimates agree at a value slightly in excess of 30 PU. On either side of this zone, both neutron porosity estimates $\phi_{epi}$ and $\phi_{th}$ exceed the density porosity $\phi_d$. The separation between the density and epithermal measurements, of some 20 PU, is due to the hydroxyls in this predominately kaolite/illite clay mixture. The additional several PU difference observed between the thermal and epithermal porosity values is due to the iron and potassium content of the illite as well as some boron associated with it.

In accordance with the invention, the separation between the neutron porosity estimates $\phi_{epi}$ and $\phi_{th}$, on the one hand, and the density porosity estimate $\phi_d$ on the other hand, can be converted to a meaningful identification of the clay type and/or a value of the clay volume by estimation of the mixture of (OH)$_4$ and (OH)$_8$ type clays present in the matrix.

In order to get an estimate of the hydroxyl content the difference between the density porosity and the epithermal neutron porosity is preferably used, although the difference between the density porosity and the thermal neutron porosity could be used instead. For clean sands, the $\phi_{epi}-\phi_d$ difference will be zero if sandstone units are used for the epithermal porosity and a grain density of 2.65 g/cc is used for the density porosity. At a porosity of 30%, if the sand matrix is replaced by a high hydroxyl clay, (OH)$_8$, the difference, $\phi_{epi}-d$, will be about 40 PU, whereas for a low hydroxyl clay, (OH)$_4$, this difference will be only 10 PU. Thus the porosity difference measurement may be used to distinguish between the two major hydroxyl categories. Before the clay volume can be ascertained, however, it is necessary also to identify the clay type.

As previously mentioned, the separation between $\phi_{epi}$ and $\phi_d$ is functionally related to both the volume of the clay present and the type of clay present. For example, a given separation might correspond to a small clay volume of type (OH)$_8$ or a much larger volume of clay of type (OH)$_4$. According to the present invention, the key to separating out these two hydroxyl types and thus arrive at a more realistic value of clay content (volume) is to combine with the $\phi_{epi}-\phi_d$ measurement an estimate of the formation $\Sigma$.

Figure 2:
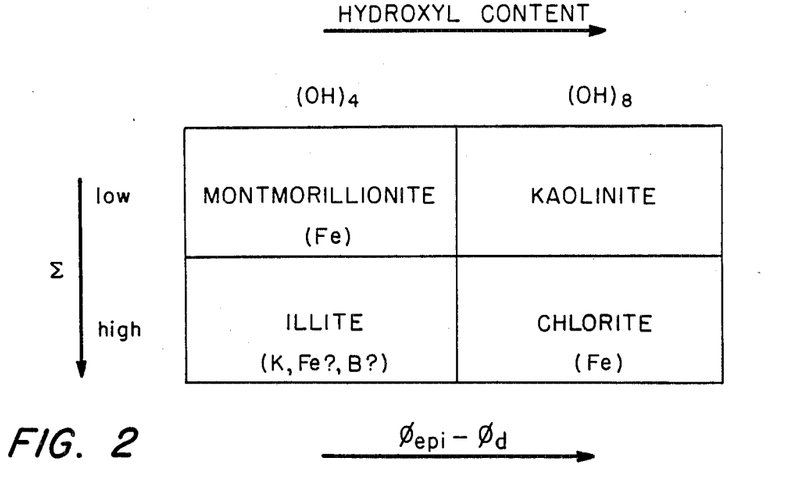
FIG. 2 is a simplified chart showing the classification of the four major clay minerals as a function of hydroxyl content, as estimated by the difference between the density porosity and the epithermal porosity, and thermal neutron capture cross section $\Sigma$.

FIG. 2 illustrates in a simplified way the usefulness of such a combination of porosity difference and $\Sigma$. In FIG. 2, the four major clay minerals, i.e., montmorillionite, illite, kaolinite and chlorite, are shown as representing the wide variety of clays known to exist. As may be seen, the cross plotting of the porosity difference $\phi_{epi}-\phi_d$, versus $\Sigma$ allows a distinction or classification as to OH type to be made based on the porosity difference and a distinction as to clay type to be made within each OH category based on $\Sigma$. Additional characteristics associated with the four representative clay minerals, such as potassium, iron or boron content, are also noted. The presence of one or more of these additional characteristics can be detected and used to provide a further basis for distinguishing between the several clay types.

Figure 3:
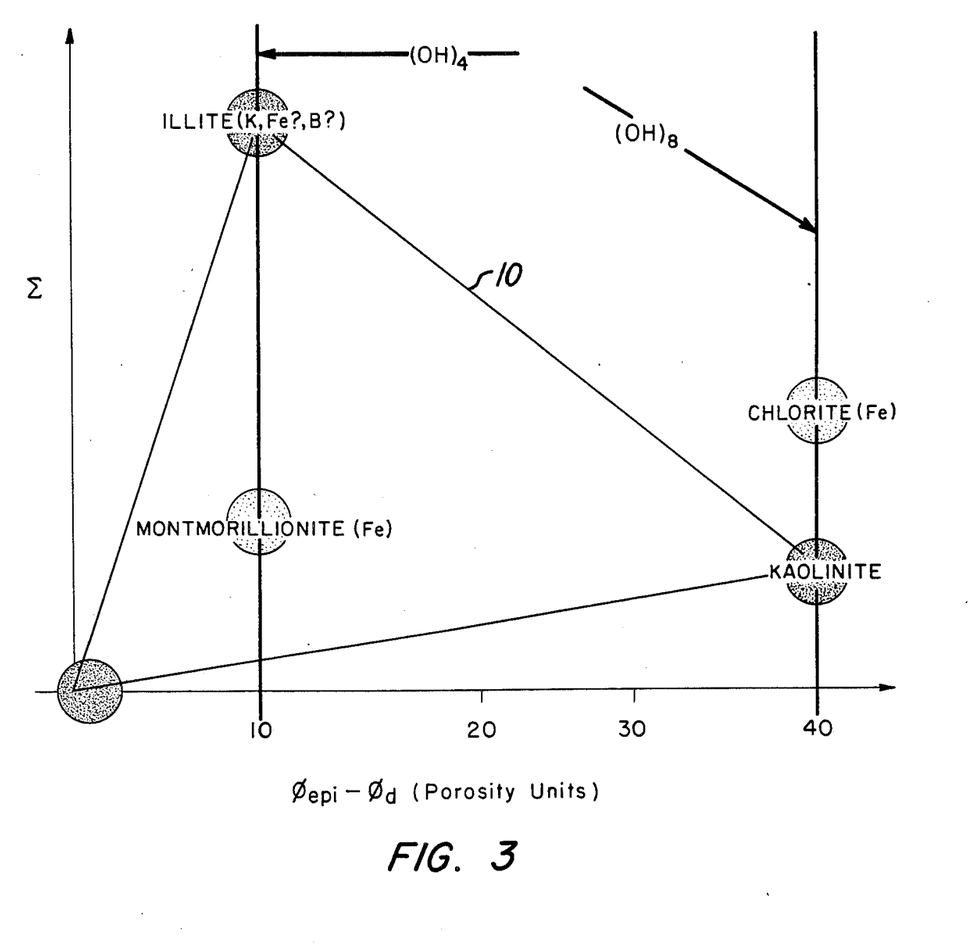
FIG. 3 is an idealized cross plot of $\Sigma$ versus the epithermal/density porosity difference, showing the locations on the plot of the four major clay types.

The principle of the invention is further illustrated in FIG. 3, which identifies the locations of the four principal clay types on a cross plot of $\Sigma$ versus $\phi_{epi}-\phi_d$. Chlorite and kaolinite are shown to the right of FIG. 3 at a porosity separation of about 40 PU, these both being (OH)$_8$ clays. The $\Sigma$ of chlorite is somewhat greater than that of the kaolinite due to the iron in the chlorite. The two (OH)$_4$ clays, illite and montmorillionite, are shown to the left at a porosity separation of about 10 PU. Illite is located at a higher $\Sigma$ due to the presence of boron. Where the $\Sigma$'s of the two low hydroxyl clays are similar, a distinction can be made between illite and montmorillionite on the basis of potassium or boron. Similarly, chlorite clays and kaolinite clays of like Z's can be distinguished on the basis of iron.

Rather than treat the more general (and more complicated) case of the occurrence of all four clay minerals simultaneously, the $\Sigma$ versus $\phi_{epi}-\phi_d$ cross plot of FIG. 3 can be reduced to a substantially triangular curve 10 by eliminating one of the clay types in each hydroxyl category, e.g. through the use of the additional potassium, iron or boron indicators, and by assuming that the formation comprises a mixture of sand (at the origin) and the two remaining clay types, e.g. illite and kaolinite in the case shown in FIG. 3. As will be appreciated, the relative volumes of sand and the two types of clays can be estimated by plotting the measured values of $\Sigma$ and the epithermal/density difference and interpolating along the legs of the triangular plot 10. The values of $\Sigma$ and $\phi_{epi}-\phi_d$ corresponding to the apices of FIG. 3 can be estimated by calculation or by actual measurements based on formation zones, or, alternatively, test pits, of known composition.

Figure 4:
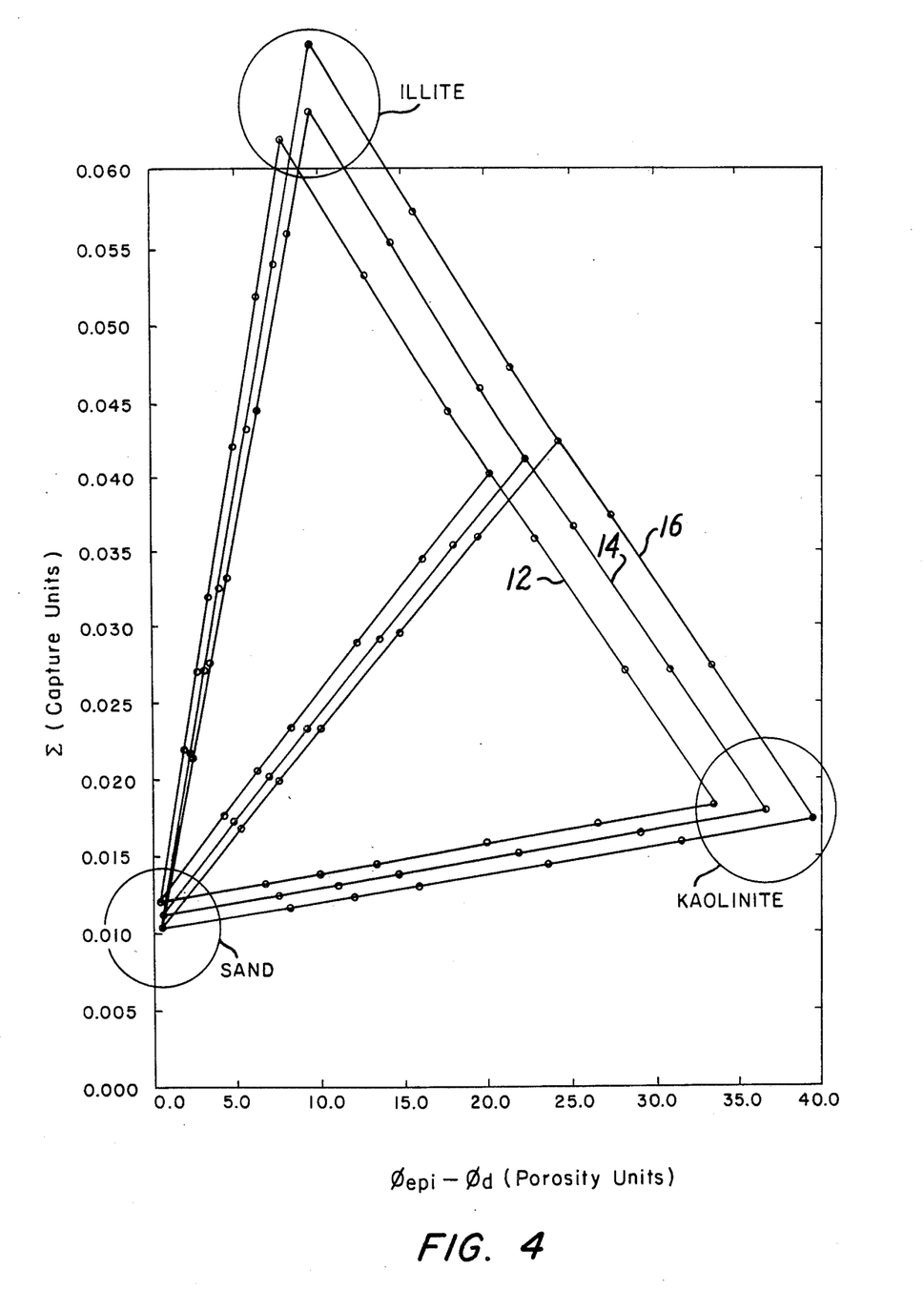
FIG. 4 is a more realistic working cross plot of $\Sigma$ versus the epithermal/density porosity difference for sandstone and various combinations of clay volumes of the two hydroxyl types.

A more realistic working cross plot is shown in FIG. 4, wherein Z and $\phi_{epi}-\phi_d$ are plotted for sandstone and various combinations of clay volumes of the two hydroxyl types, in this case kaolinite and illite. The three triangular curves 12, 14, and 16 shown correspond to true porosities of 30%, 25% and 20%, respectively.

Each apex point for each triangular curve 12, 14 and 16 consists of a pair of values ($\phi_{epi}-\phi_d$) and $\Sigma$. These points may be determined as follows for the purpose of constructing the curves of FIG. 4.

The general relationship for $\Sigma$ is:

$$\Sigma = \Sigma_{FL}\phi + \Sigma_{MA}(1-\phi) \tag{1}$$

where $\Sigma_{FL}$ is the capture cross section of the formation fluid (=22 c.u. (0.022 in FIG. 4) for the case of fresh water), and $\Sigma_{MA}$ is the capture cross section of the formation matrix (in this case the sand or the clay).

The value of $\Sigma_{MA}$ for illite may be taken as 80 c.u. (0.08 in FIG. 4) and for kaolinite may be taken as 16 c.u. (0.016 in FIG. 4). Then for each porosity 30%, 25% and 20%, the values of $\Sigma$ for the corresponding apex points of the curves 12, 14 and 16, respectively, may be determined from Eq. (1).

In determining the value of $\phi_{epi}-\phi_d$ for the apex points, the variation of the slowing down length, $L_S$, with porosity for each material (sand, illite and kaolinite) is used to predict the response. The variation of $L_S$ with porosity for each material may readily be calculated from the cross sections of the materials using well known physical principles. The same value of $L_S$ will yield a different porosity value for the different materials, and values of $\phi_{epi}-\phi_d$ may thus be determined. For example, a given value of $L_S$ in a 20 p.u. illite may be the same as the $L_S$ for a 27 p.u. clean sand. In this case, $\phi_{epi}$ would read 27 p.u. and $\phi_d$ (assuming a density, $\rho$, for illite of 2.65 g/cc) would read 20 p.u., leaving a difference of 7 p.u.

The fact that the three curves 12, 14 and 16 substantially coincide evidences the basic insensitivity of the epithermal/density difference to the actual porosity and its dependence on clay volume. The apex at the lower right of FIG. 4 is for pure kaolinite, $(OH)_8$, and the upper apex is for illite, $(OH)_4$ containing 400 ppm of boron. The $\Sigma$ values of the upper and lower apices depend on the $\Sigma$ of the respective clay types, which values are available from standard references for the various clays. For the inclusion of an absorber, such as boron, the additional capture units produced by the amount of absorber present are added to the $\Sigma$ of the pure clay. For example, boron adds 45,000 c.u. for each 1 g/cc of boron present.

Figure 5:
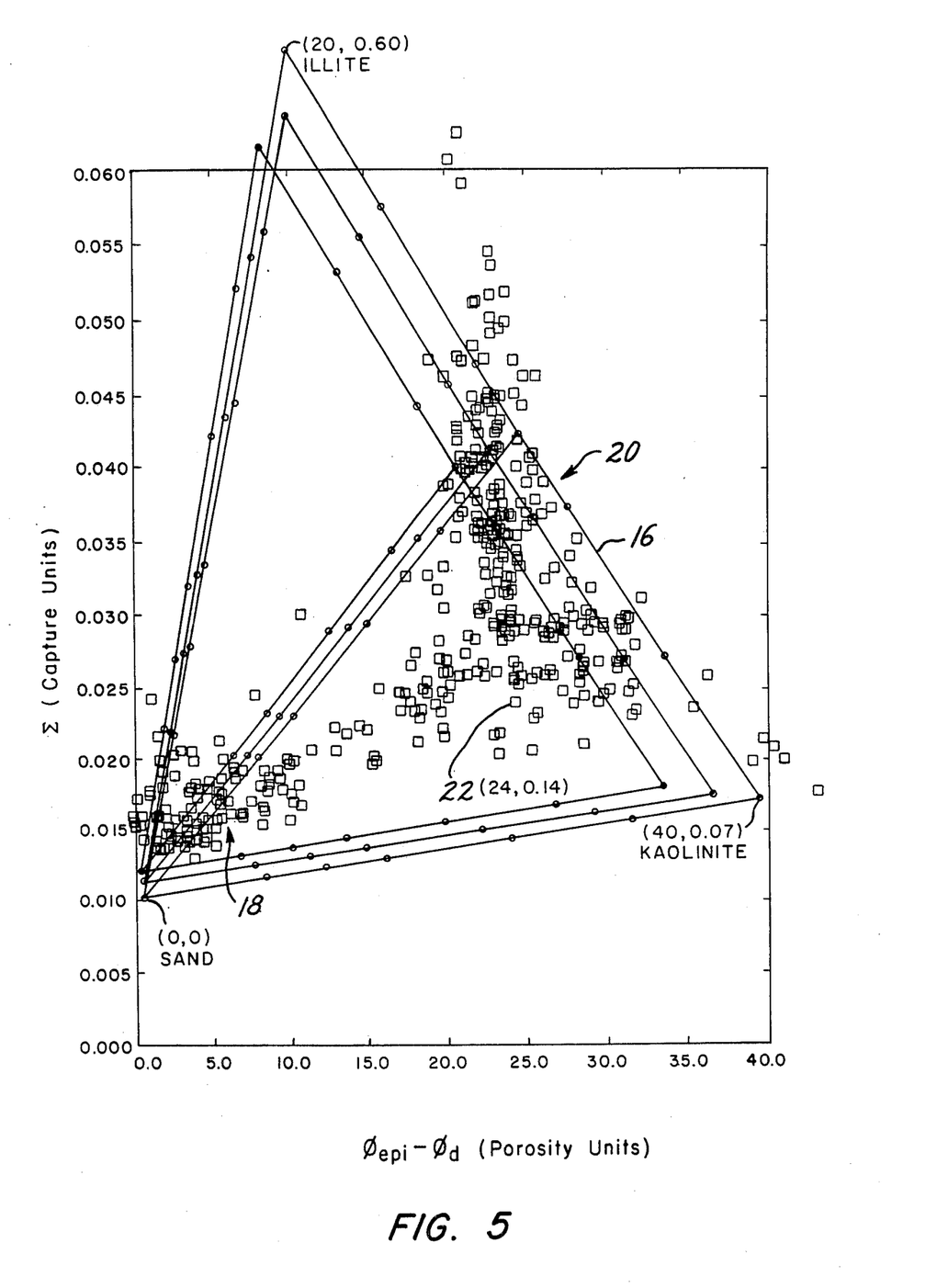
FIGS. 5-7 depict illustrative $\Sigma$ versus $\phi_{epi} - \phi_d$ cross plots for various zones in an actual well bore.
Figure 6:
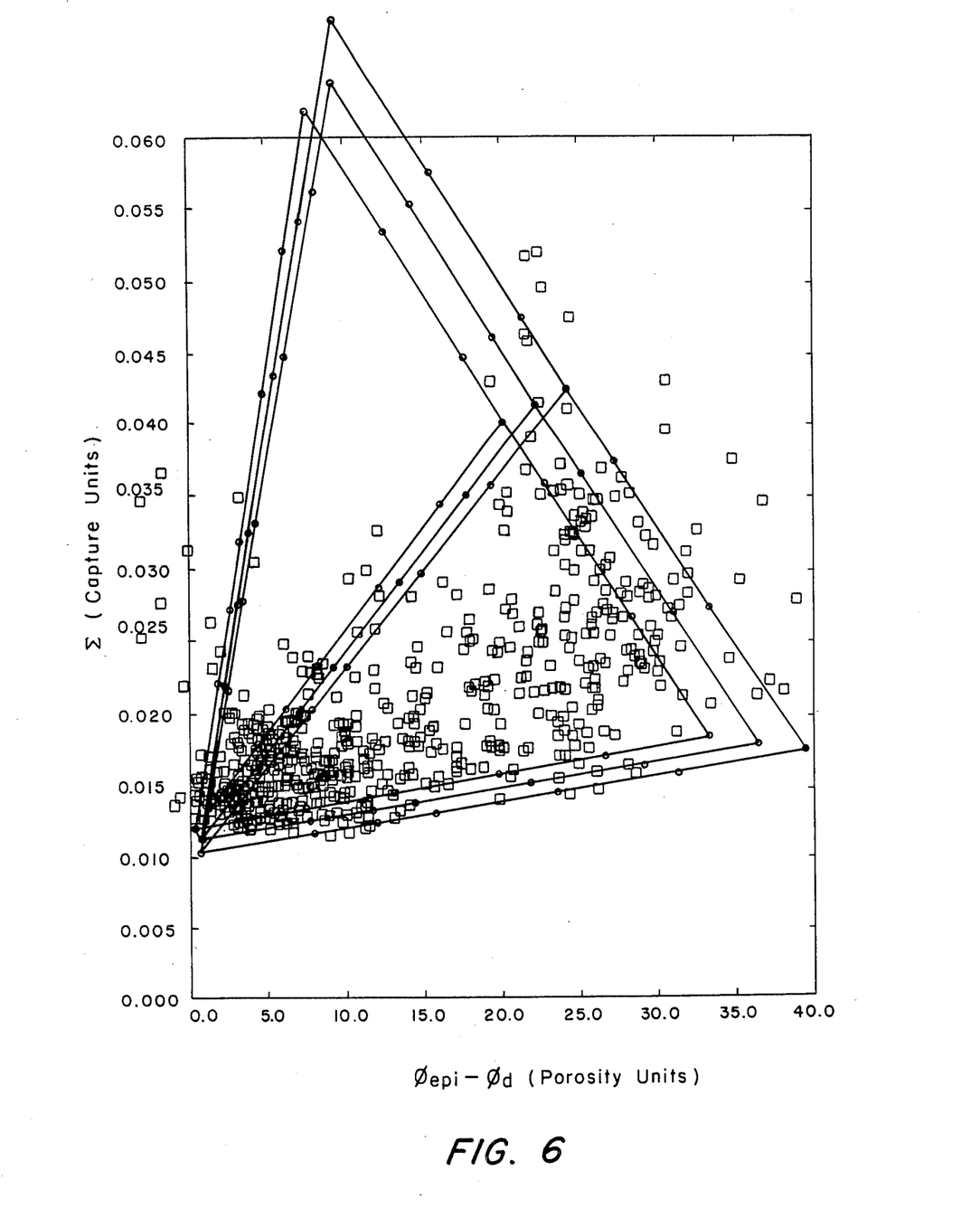
Figure 7:
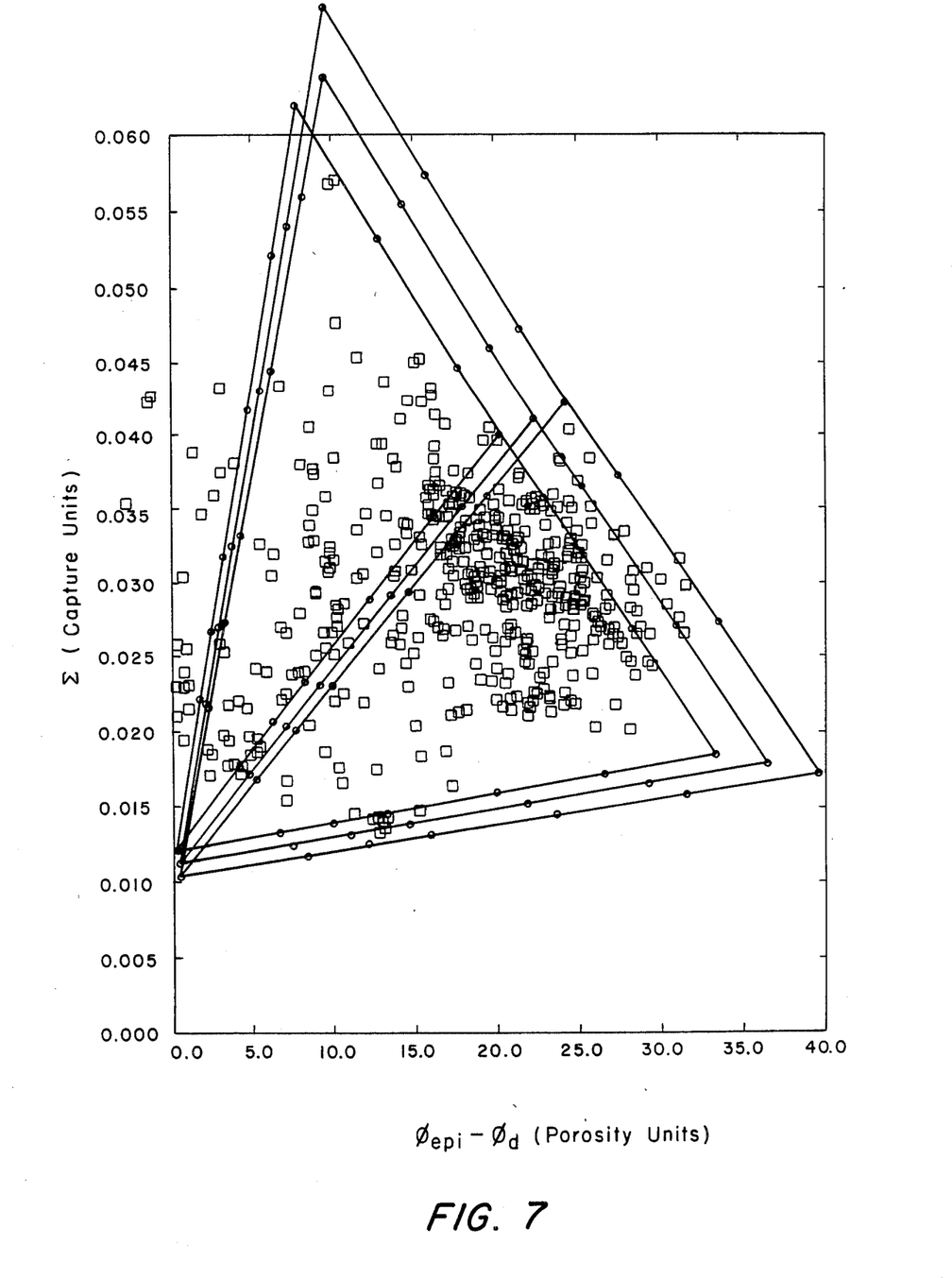

The relative volumes of sand and the two types of clay can be estimated by plotting the log values with the curves 12, 14 and 16 as an overlay. This is illustrated in FIGS. 5-7 with actual log values. The $\Sigma$ values as plotted on FIGS. 5-7 have been reduced by 2.4 CU to account for the macroscopic capture cross section of the water, $\Sigma_{wa}$.

FIG. 5 shows plots of the $\Sigma$ and $\phi_{epi}-\phi_d$ log values from a lower zone, 2180 to 2395 feet, of the well. The concentration of points 18 near the origin indicates the presence of nearly clean sand, which occurs near the top of the zone. Another concentration of points 20 to the right is indicative of a shale mixture of kaolinite and illite. FIG. 6 shows the middle segment of the well, 1820 to 2180 feet, which is predominantly sand and some shale. It may be seen that the major clay present in the sand is kaolinite in most of the shaly zones. FIG. 7 shows the very shaly top section of the well, 1600 to 1820 feet, which contains very little sand and the clay rarely exceeds 50% illite.

From FIGS. 5-7, the relative volume fractions of the three components may be determined for any measured point. With reference to FIG. 5 by way of illustration, the first step is to define the particular triangular curve to be employed. This requires only a rough knowledge of the porosity, e.g., sufficient to distinguish between 20 p.u., 25 p.u. and 30 p.u. Further accuracy is not essential.

A coordinate system (X,Y) is then established, where:

$$X | \phi_{epi}-\phi_d \tag{2}$$

and $$Y | \Sigma_{measured}-\Sigma_{sand} \tag{3}$$

The X,Y coordinates for the apices of the 20% porosity triangular curve 16 are shown in FIG. 5.

For any measured point (X,Y), such as that indicated at 22 in FIG. 5, the respective relative volume fractions may be determined by using the relationship:

$$V_{sand}+V_{illite}+V_{kaolinite}=1 \tag{4}$$

and the linear combinations for the epithermal/density porosity differences and the sigma differences:

$$X=\phi_{epi}-\phi_d=20V_{illite}+40V_{kaolinite} \tag{5}$$

$$Y=\Sigma_{measured}-\Sigma_{sand}=0.07V_{illite}+0.60V_{kaolinite} \tag{6}$$

From Eqs. (5) and (6), the relative volume fractions, V, for illite and kaolinite may be found. The volume fraction for sand may then readily be determined from Eq. (4).

As will be understood, the determination of the sand and clay volume fractions may be readily achieved by incorporating the triangular overlay of FIG. 4 in the memory of a general purpose digital computer and by computing the respective volume fractions from the measured values of $\Sigma$ and $\phi_{epi}-\phi_d$. Programming of the computer to carry out such computations involves only the straightforward application of conventional mathematical interpolation procedures and is easily within the ability of those skilled in the art.

The $\Sigma$ versus $\phi_{epi}-\phi_d$ cross plot allows estimation of the clay type and/or volume fraction of $(OH)_4$ and $(OH)_8$ clays as long as the intrinsic $\Sigma$ values of the clays are different. In the case of clays of different hydroxyl types but similar intrinsic values of $\Sigma$, the cross-plot technique can still be used by replacing $\Sigma$ with an estimate of the iron content or the potassium content of the formation.

The log values of $\Sigma$, $\phi_{epi}$ and $\phi_d$ may be measured with any suitable logging tool. For example, $\Sigma$ (or equivalent macroscopic absorption cross section parameters) may be derived in accordance with U.S. Pat. No. 4,384,205, issued May 17, 1983 to C. Flaum or with U.S. Pat. No. Re. 28,477, issued July 8, 1975 to W. B. Nelligan. Alternatively, the gamma ray spectroscopy tool described in U.S. Pat. No. 4,055,763, issued Oct. 25, 1977 to S. Antkiw, operated in the capture-$\tau$ mode may be employed. The epithermal neutron porosity and the thermal neutron porosity may be measured separately, with suitable tools, but preferably are determined in the same logging run by use of the combined epithermal/thermal porosity tool, CNT-G, described in the R. R. Davies et al. paper entitled "A Dual Porosity CNL ™ Logging System", Society of Petroleum Engineers, 56th Annual Fall Technical Conference and Exhibition, 1981 (SPE 10296). The additional clay characteristic indicators, potassium, iron and boron, may likewise be measured by conventional techniques. The potassium content, for instance, can be obtained from a natural gamma ray tool, while the iron content can be quantified by use of the photoelectric factor, $P_e$, from the lithodensity tool, as described in U.S. Pat. No. 3,321,625, issued May 23, 1967 to J. S. Wahl and in U.S. Pat. No. 4,048,495, issued Sept. 13, 1977 to D. V. Ellis, or by use of a gamma spectroscopy tool, as described in the aforementioned U.S. Pat. No. 4,055,763.

Although the invention has been described herein by reference to specific embodiments thereof, it will be understood that such embodiments are susceptible of variation and modification without departing from the inventive concepts disclosed. All such variations and modifications, therefore, are intended to be included within the spirit and scope of the appended claims.

I claim;

1. A method of evaluating the clay content of an earth formation, comprising:
   deriving a first measurement of formation porosity by use of a neutron-type porosity measurement technique;
   deriving a second measurement of formation porosity by use of a density-type porosity measurement technique;
   combining said first and second porosity measurements to derive a measurement of the porosity difference between said measurements, said porosity difference being functionally related to the volume and hydroxyl type of the clay content of the formation;
   deriving a measurement of a characteristic of the formation that is functionally related to clay type; and
   combining said porosity difference measurement and said formation characteristic measurement to derive an indication of at least one of the clay type and the relative volume of the clay content of the formation.

2. The method of claim 1 wherein said first porosity measurement is derived by use of an epithermal neutron porosity tool.

3. The method of claim 1 wherein said formation characteristic comprises the thermal neutron macroscopic absorption cross section of the formation.

4. The method of claim 3 further comprising deriving a measurement of at least one additional formation characteristic which is functionally related to clay type to provide additional information indicative of clay type.

5. The method of claim 4 wherein said additional formation characteristic comprises the formation content of a mineral identifiable with one or more specific clay types.

6. The method of claim 5 wherein said additional formation characteristic comprises the iron content of the formation.

7. The method of claim 5 wherein said additional formation characteristic comprises the potassium content of the formation.

8. The method of claim 1 wherein said formation characteristic comprises the formation content of a mineral identifiable with one or more specific clay types.

9. The method of claim 8 wherein said formation characteristic comprises the iron content of the formation.

10. The method of claim 8 wherein said formation characteristic comprises the potassium content of the formation.

11. The method of claim 1 wherein said indication of clay type is indicative of whether the hydroxyl type is $(OH)_4$ or $(OH)_8$.

12. A method of evaluating the clay content of an earth formation from a record of first and second porosity measurements of the formation derived from neutron-type and density-type measurement techniques, respectively, and a measurement of at least one formation characteristic that is functionally related to clay type, comprising:
    combining said first and second porosity measurements to derive a measurement of the porosity difference between said measurements, said porosity difference being functionally related to the volume and hydroxyl type of the clay content of the formation; and
    combining said porosity difference measurement and said formation characteristic measurement to derive an indication of at least one of the clay type and relative volume of the clay content of the formation.

13. The method of claim 12 wherein said first porosity measurement is derived from an epithermal neutron-type tool.

14. The method of claim 12 wherein said formation characteristic comprises the thermal neutron macroscopic absorption cross section of the formation.

15. The method of claim 14 wherein said record includes a measurement of at least one additional formation characteristic that is functionally related to clay type, and wherein said method further comprises utilizing said additional characteristic measurement to provide additional information indicative of clay type.

16. The method of claim 15 wherein said additional formation characteristic comprises the formation content of a mineral identifiable with one or more specific clay types.

17. The method of claim 16 wherein said additional formation characteristic is the iron content of the formation.

18. The method of claim 17 wherein said additional formation characteristic is the potassium content of the formation.

19. The method of claim 12 wherein said formation characteristic comprises the formation content of a mineral identifiable with one or more specific clay types.

20. The method of claim 19 wherein said formation characteristic is the iron content of the formation.

21. The method of claim 19 wherein said formation characterisic is the potassium content of the formation.

22. The method of claim 12 wherein said indication of clay type is indicative of whether the hydroxyl type is $(OH)_4$ or $(OH)_8$.

* * * * *